United States Patent
Rutz et al.

(10) Patent No.: US 6,634,227 B1
(45) Date of Patent: Oct. 21, 2003

(54) LEVEL PROBE FOR POWDER CONTAINER

(75) Inventors: Guido Rutz, Gossau (CH); Hans Peter Michael, St. Gallen (CH)

(73) Assignee: ITW Gema AG, St. Gallen (CH)

( * ) Notice: Subject to any disclaimer, the term of this patent is extended or adjusted under 35 U.S.C. 154(b) by 0 days.

(21) Appl. No.: 09/937,218

(22) PCT Filed: Feb. 7, 2000

(86) PCT No.: PCT/EP00/00950

§ 371 (c)(1),
(2), (4) Date: Sep. 24, 2001

(87) PCT Pub. No.: WO00/58015

PCT Pub. Date: Oct. 5, 2000

(30) Foreign Application Priority Data

Mar. 25, 1999 (DE) .......................... 199 13 448

(51) Int. Cl.[7] .............................................. G01F 23/00
(52) U.S. Cl. ......................... 73/290 R; 73/715; 73/722
(58) Field of Search .............................. 73/290 R, 301, 73/303, 700, 715, 722, 866.5, 866, 432.1

(56) References Cited

U.S. PATENT DOCUMENTS

| 3,650,436 A | 3/1972 | Barber |
| 4,562,358 A | * 12/1985 | Hösel .......................... 307/118 |
| 4,812,086 A | 3/1989 | Kopernicky |
| 5,294,217 A | 3/1994 | Talacko et al. |
| 5,905,212 A | * 5/1999 | Moses et al. ........... 73/862.451 |

FOREIGN PATENT DOCUMENTS

| DE | 39 05 236 | 10/1989 |
| DE | 196 11 533 | 9/1997 |
| DE | 198 08 765 | 9/1999 |
| EP | 0 185 479 | 4/1991 |
| EP | 0 452 635 | 10/1991 |
| EP | 0 578 332 | 1/1994 |

* cited by examiner

*Primary Examiner*—Helen Kwok
*Assistant Examiner*—Rodney T. Frank
(74) *Attorney, Agent, or Firm*—Lowe Hauptman Gilman & Berner, LLP

(57) ABSTRACT

The invention relates to a level detecting system for a powder container of a powder-coating apparatus. It contains an inductive proximity sensor (22) and an electrically insulating membrane (28) which is displaceable to-and-fro the proximity sensor and which is fitted on its inside surface opposite the proximity sensor with a metallic element (32) affixed to it and affecting the magnetic properties of the proximity sensor. The level detecting system operates regardless of any powder particles adhering to it.

15 Claims, 2 Drawing Sheets

LEVEL PROBE FOR POWDER CONTAINER

FIELD OF THE INVENTION

The present invention relates to a level probe, hereafter level detecting system, for a powder container in a powder spray-coating apparatus.

BACKGROUND ART

The state of the art contains the following:
EP 0 185 479 B1,
EP 0 452 635 B1,
DE 198 08 765 A1,
DE 196 11 533 A1,
DE 39 05 236 A1.

The European patent document 0 185 479 B1 discloses powder spray-coating apparatus for spray-coating objects using a powder coating material, wherein a first pump pneumatically conveys coating powder from a first powder container into a second powder container and a second pump conveys the powder from the second powder container to a spray apparatus. A powder overflow device keeps the powder level constant in the second powder container and returns excess powder into the first powder container.

Both powder containers are fitted with a perforated upper bottom crossed from below to top by the fluidizing compressed air into the powder present on this upper bottom and "fluidizing" this powder, that is, the powder particles are kept floating in this fluidizing compressed air.

The European patent 0 452 635 discloses a pneumatic fluidizing and evacuation unit which can be immersed into a powder container in order to fluidize powder therein and to evacuate this fluidized powder from the container and convey it to a spray apparatus or another. The fluidizing and evacuation unit is fitted with a level detector generating an electrical signal as a function of depth of immersion into the fluidized powder. The electrical signal controls an advance system by means of which the fluidizing and evacuation unit jointly with the level detector always is kept at the same depth of immersion in the fluidized powder and is made to automatically follow the dropping powder level when the quantity of powder decreases. As a result, identical powder concentration and identical powder/airflow conditions are maintained at the lower, powder-aspirating end of a suction tube of the fluidizing and evacuation unit regardless of the height of the powder in the powder container. Consequently uniform power feed to a spray apparatus is assured.

It is known in practice to use so-called capacitive detectors as the level detectors, their capacitance changing as a function of the powder concentration in the detector vicinity. This procedure however entails the substantial drawback of spurious test results caused by powder particles which over the time collect at the detector and adhere to it.

SUMMARY OF THE INVENTION

The objective of the invention is to solve the problem of designing a level detecting system for powder containers in such manner that it shall operate continuously and accurately regardless of any powder particles adhering to it. Preferably such a level detecting system may be designed to operate not only vertically, but instead in any arbitrary position, for instance also horizontally, when detecting the powder level in a powder container.

The expression "powder container" not only includes a "rigid" container, but also a "flexible" one such as a pouch made of plastic or another material.

The goal of the invention is attained using an inductive proximity sensor, further a membrane configured opposite this proximity sensor and moved in reciprocating manner by the pressure exerted by fluidized powder on its external side away from the proximity sensor, and a metallic element mounted on the membrane inside surface opposite the proximity sensor and jointly moving with latter and thus affecting the proximity's sensor magnetic properties.

The following advantages in particular are offered by the invention: the test signals are permanently accurate regardless of any adhering particles. Accordingly it is also maintenance-free. Moreover it may be used in any arbitrary direction rather than only vertically, namely for instance also horizontally, when determining the powder level in a powder container. It may be assembled from a few, commercially accessible parts and accordingly both its manufacture and its operation are economical.

BRIEF DESCRIPTION OF THE DRAWINGS

The invention is elucidated below in a preferred embodiment and in relation both to the drawings and to preferred applications.

DETAILED DESCRIPTION OF THE INVENTION

Figure 1:
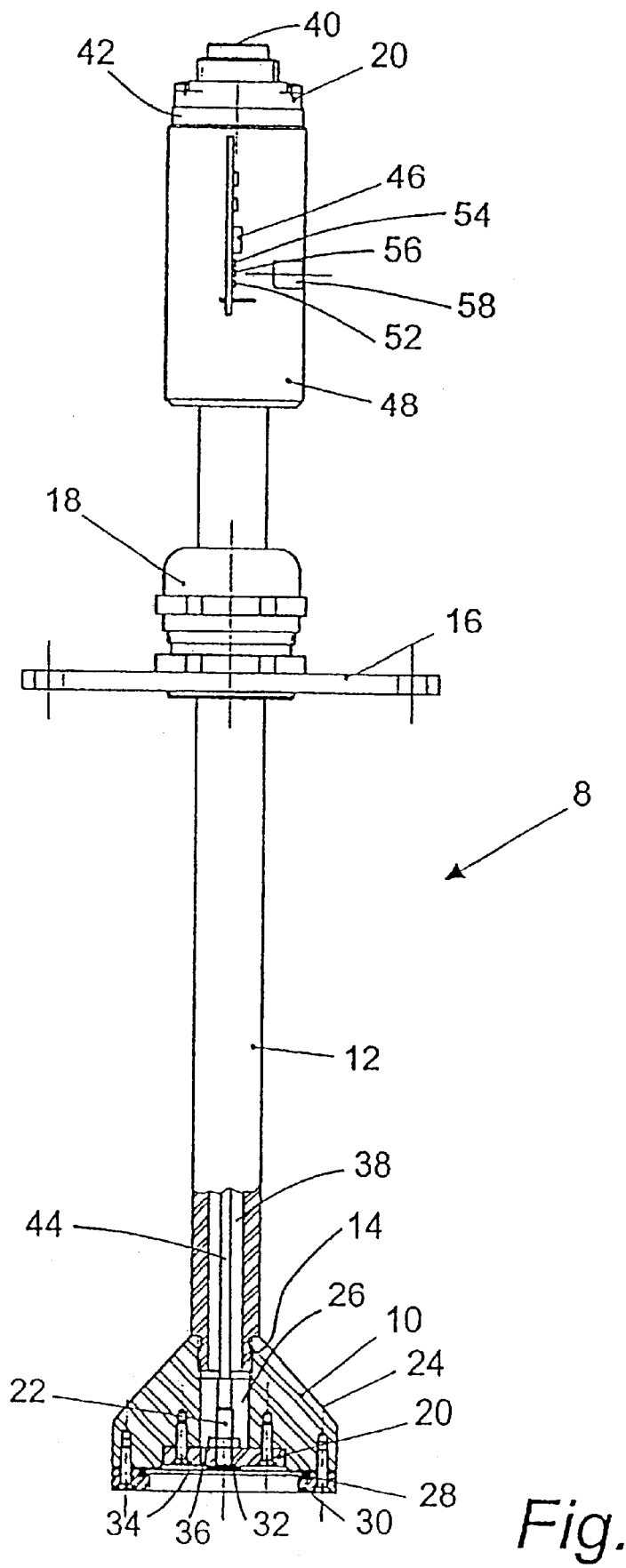
FIG. 1 is a side view and in axial section at the lower end of a powder container.

The level detecting system 8 sensing the powder level in powder containers substantially consists of a detector head 10; of a tube 12 with a thread 14 at one end to affix the detector head 10; of a support 16 comprising a clearance through which passes the tube 12; of a fastener 18 in the form of a quick-connect for instance, to which the support is affixed and which passes the tube 12 in such a manner that this tube is adjustable in its longitudinal direction relative to the support 16 and can be affixed to it in any arbitrary longitudinal position.

The detector head 10 contains an affixation disk 20 fitted with a central clearance receiving an inductive proximity sensor 22 that is mounted on the affixation disk 20 and configured axially to the tube 12. The affixation disk 20 is mounted on a head element 24 comprising a clearance 26 running axially relative to the tube 12 and being entered by he proximity sensor 22.

A membrane 28 is clamped between an end face of the head element 24 away from the tube 12 and a retaining ring 30 screwed onto the head element.

A metallic element 32, preferably a metal pane 32, is mounted axially relative to the proximity sensor on the inside of the membrane 28 opposite the proximity sensor 22 and is affixed, preferably bonded or vulcanized to the membrane 28. As a result the metallic element 32 jointly with the membrane 28 may be displaced to-and-fro the proximity sensor 22 as a function of the pressure exerted by the fluidized powder on the external membrane side 34 radially accessible inside the retaining ring 30 and can be contacted by the fluidized powder. When in a neutral position wherein the external membrane side 34 is unpressurized—except for atmospheric pressure—the membrane 28 and its metallic element 32 are axially away from the proximity sensor 22

The metallic element consists of a metal, preferably iron, which shall alter the magnetic properties, in particular its inductance of the proximity sensor 22, as a function of said element's distance from this proximity sensor.

The gap between the membrane 28 and the affixation disk 20 is vented to preclude air pressure at the membrane inside surface from counteracting in undesired manner axial displacements of the membrane 28 caused by pressure changes on the external membrane side 34. Preferably this gap pneumatically communicates through at least one axis-parallel borehole 36 in the affixation disk 20 with the tube duct 38 in turn communicating for instance by a vent 42 with the atmosphere at the tube end 40 away from the detector head 10.

Preferably the affixation disk 20 is made of an electrically insulating material such as plastic in order not to affect the inductance of the proximity sensor 22. The head element 24 and the tube 12 may be made of metal or of plastic.

The proximity sensor 22 is connected by a multi-conductor cable 44 to an electronic control unit 46. This control unit 46 electrically powers the proximity sensor 22 which transmits to it data concerning the distance between the metallic element 32 of the membrane 28 from the sensor 22. Preferably the electronic control unit 46 contains at least one microprocessor and it is used to control at least one sub-assembly, preferably a powder conveyor, as described below in relation to FIG. 3. The electronic control unit 46 may be housed in a system separate from the level detecting system 8 or, as in the manner of the embodiments described herein, in a housing 48 which is mounted on one end segment of the tube 12 situated at the other side of the support 16 away from the detector head 10. Preferably the housing 48 shall be a bush coaxially enclosing the tube 12 and receiving the control unit 46. Consequently the electronic control unit 46 together with the housing 48, the tube 12 and the detector head 10 together with the proximity sensor 22 and the membrane constitute one assembly which is operational with or without the support 16 and the fastener 18.

In the preferred embodiment, the proximity sensor 22 is a proximity switch which shall switch when the metallic element 32 approaches.

The electronic control unit 46 may contain optical displays of the operational state of the level detecting system 8. Illustratively an optical display 52, for instance a green light, may be used to indicate electrical power being fed to the proximity sensor 22. Also an optical display 54, for instance a red light, may be used to indicate absence of pressure, or pressure below a predetermined level, on the external membrane side 34; again an optical display 56, for instance a yellow light, may indicate a critical pressure on the external membrane side 34. Additionally or alternatively, acoustic indicators also may be used. The displays may be protected through a viewing pane 58 in the housing 48 from the ambience outside the housing and hence against soiling.

Preferably the membrane 28 shall be an intrinsically bending or flexible disk. The metallic element 32 preferably is a metal pane of a diameter substantially less than that of the membrane 28, for instance being only one sixth or less that of the membrane diameter.

To preclude fluttering of the membrane 28 generating spurious control signals at the control unit 46, latter preferably shall be fitted with delay or damping means in such a manner that control signals shall be generated only when the membrane states shall be substantially stable.

Figure 2:
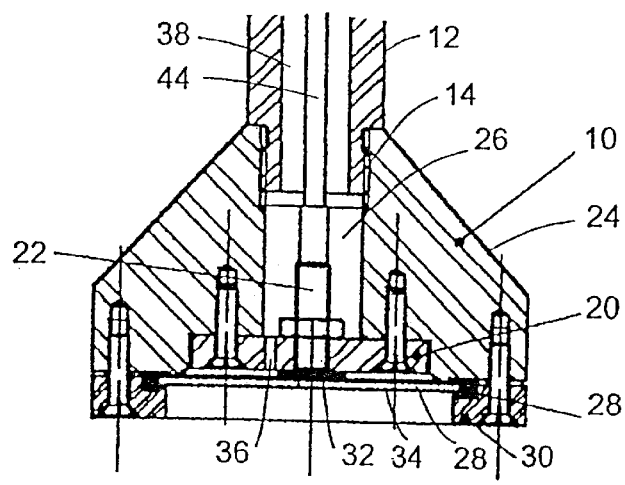
FIG. 2 is an enlargement of the lower end of FIG. 1.
Figure 3:
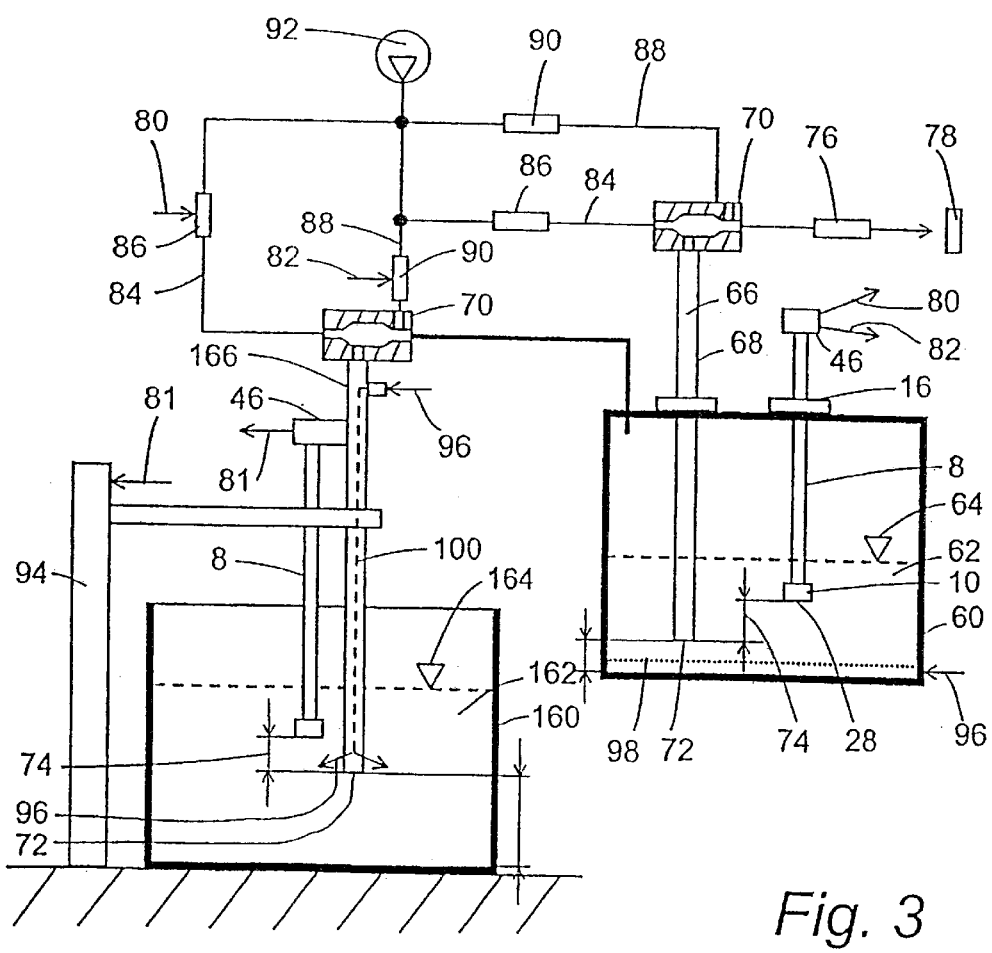
FIG. 3 is a powder spray-coating apparatus fitted with level detecting systems of FIG. 1 for powder containers.

FIG. 3 shows two preferred applications of the level detecting system 8 of FIGS. 1 and 2.

In one of the preferred applications, the level detecting system 8 dips by means of its detector head 10 into a powder container 60 in order to maintain fluidized powder 62 therein at a predetermined level 64.

A pneumatic conveying sub-assembly 66 contains a suction tube 68 of which the lower end dips into the powder 62 in the powder container 60 and of which the upper end is affixed to an injection pump 70. The lower tube end is fitted with a powder suction aperture 72 which is lower by a predetermined vertical distance 74 (or higher or at the same level) than the membrane 28 of the detector head 10. Powder 62 from the powder container 60 is moved by the injector 70 to a spray apparatus 76 and is sprayed onto an object 78 to be coated.

When the powder level 64 drops to a predetermined magnitude, the control unit 46—by means of schematically indicated lines 80 and 82—switches ON a second pneumatic conveyor 166 which shall move fluidized coating powder 162 from a second powder container 160 into the other powder container 60 until latter has reached the same level again or another one, namely 64. Accordingly the level detecting system 8 maintains a constant level 64 of a predetermined magnitude or a predetermined range of magnitudes in the powder container 60. By keeping the level or the range of levels 64 constant while simultaneously keeping constant the vertical distance 74 between the powder suction aperture 72 and the membrane 28, the same air/powder pressures always are present at this aperture 72 and therefore only the desired rate of powder shall always be fed from the injector 70 to the spray apparatus 76. The output from the injector 70 is substantially determined by the air pressure applied to it by an air conveying line 84, said air pressure being adjustable by an adjusting element 86 contained in said line 84 and illustratively being a pressure control, a flow baffle or a valve. In manner known in the state of the art, compressed air in the form of supplementary air also may be fed through a supplementary air line 88 to the injector 70 and be controlled or regulated by a further adjusting element 90 of a design which may be similar or the same as that of the adjusting element 86.

The second powder conveying system 166 may be designed in the same manner shown in FIG. 3, and is denoted by the same references. The two powder conveying sub-assemblies may be fed from a common source of compressed air 92.

In relation to a second level detecting system 8 affixed to a lift 94 or to the powder conveying sub-assembly 166 for common vertical displacement, the second powder conveying sub-assembly 166 is vertically displaced by the lift 94 in relation to the powder level 164. This vertical displacement as a function of the powder level 164 is controlled or regulated by the control unit 46 of this powder conveying system 166 as schematically indicated by arrows 81 symbolizing electrical lines.

The powder suction apertures 72 must not be sealed by the bottom of the container 60 or 160. Therefore they must be elevated above the container bottom or they must be constituted in the suction tube 68 or 100 or sideways in the tube wall.

In both containers 60 and 160, the powder 62 or 162 is kept fluidized by feeding in known manner fluidizing compressed air into the powder. The fluidizing compressed air 96 illustratively may be applied through a perforated upper floor 98 schematically indicated for the powder container 60, or through a line, or in parallel with the suction tube 68, into the container's powder, the latter being schematically indicated by a dashed line 100 for the second powder conveying sub-assembly 166.

Preferably the membrane 28 shall be a thin, flexible pane. It may consist of an electrically conducting material, but preferably it shall be an electrically insulating material such as rubber.

What is claimed is:

1. A level detecting system for a powder container in a powder spray-coating apparatus, said system comprising:

an inductive proximity sensor (22);

a membrane (28) disposed opposite said proximity sensor and being displaceable to-and-fro said proximity sensor, said membrane having an outer surface (34) adapted to be subject to a pressure of fluidized powder contained in the powder container and an inner surface facing said proximity sensor;

a metallic element (32) made of a metal affecting a magnetic property of said proximity sensor, said metallic element being disposed on the inner surface of said membrane and connected to said membrane to attain common displacement of said membrane and said metallic element; and an electronic control unit (46) coupled to said proximity sensor for converting electrical signals received from the proximity sensor (22) into electric control signals controlling electrical components (86,90,94) of a pneumatic powder conveyor (166) of the powder spray-coating apparatus as a function of the pressure exerted by the fluidized powder on said membrane.

2. A level detecting system as claimed in claim 1, wherein the control unit comprises at least one display (52, 54, 56, 58) to indicate at least one operational state of the proximity sensor (22).

3. A level detecting system as claimed in claim 1, wherein the control unit (46) includes at least one electrical response delay device for automatically suppressing signal fluctuations of the proximity sensor (22) of a frequency higher than a predetermined limit value in such a way that the signal fluctuations shall not entail a change in the electric control signals.

4. A level detecting system as claimed in claim 1, wherein said proximity sensor (22) and said membrane (28) are mounted at one end of a tube (12) which can be dipped into the powder container; and the electric control unit (46) is affixed to the other end of the tube (12) which is away from the proximity sensor (22).

5. A level detecting system as claimed in claim 1, wherein the membrane (28) is made of an electrically insulating material.

6. A level detecting system as claimed in claim 1, wherein the membrane (28) is a membrane disk having an outer edge zone affixed to a housing; and the metallic element (32) is a metal disk mounted in a central region of said membrane disk and having a substantially smaller diameter than said membrane disk.

7. A level detecting system as claimed in claim 1, wherein the metallic element (32) is vulcanized onto the membrane (28).

8. A level detecting system as claimed in claim 1, wherein the proximity sensor (22) is a proximity switch.

9. A level detecting system as claimed in claim 1, wherein the proximity sensor (22) and the membrane (28) are mounted at one end of a tube (12) which can be dipped into the powder container.

10. A level detecting system as claimed in claim 9, wherein the tube (12) is affixed to a support (16) so as to be longitudinally displaceable relative to the support.

11. A level detecting system as claimed in claim 9, wherein the inner surface of said membrane communicates through the tube (12) with the external atmosphere.

12. A level detecting system for a powder container in a powder spray-coating apparatus, said system comprising:

a proximity sensor having a magnetic property and configured to generate an electrical signal as a function of the magnetic property;

a membrane disposed opposite said proximity sensor and being displaceable to-and-fro said proximity sensor, said membrane having an outer surface exposed to an interior of said powder container and an inner surface facing said proximity sensor;

an element made of a material affecting the magnetic property of said proximity sensor, said element being attached to said membrane to attain common displacement of said membrane and said element;

a sensor head having a central axial bore and an end face;

an affixation element fastened to the end face of said sensor head, said proximity sensor being attached to said affixation element to extend along the central axial bore of said sensor head; and an annular retaining element fastened to the end face of said sensor head to clamp said membrane between said retaining element and the end face of said sensor head;

wherein said membrane, and hence said element, is not mechanically biased away from said proximity sensor.

13. The system of claim 12, wherein a gap between said membrane and said affixation element is ventilated to the atmosphere so that said membrane is in a relaxed state when a pressure exerted on the outer surface thereof is the atmosphere pressure.

14. The system of claim 12, further comprising a tube to one end thereof said sensor head is attached, said tube being sufficiently long to allow said end, and hence said sensor head, to be dipped into the powder container while the other end of said tube extending outside the powder container.

15. The system of claim 12, further comprising an electronic control unit electrically coupled to said proximity sensor for converting the electrical signal received from the proximity sensor into a control signal controlling at least one electrical component of a pneumatic powder conveyor of the powder spray-coating apparatus as a function of a pressure exerted by the powder on said membrane.

* * * * *